April 5, 1927.
A. H. STAHL
1,623,210
HORSE COLLAR CUSHION
Filed Sept. 22, 1926
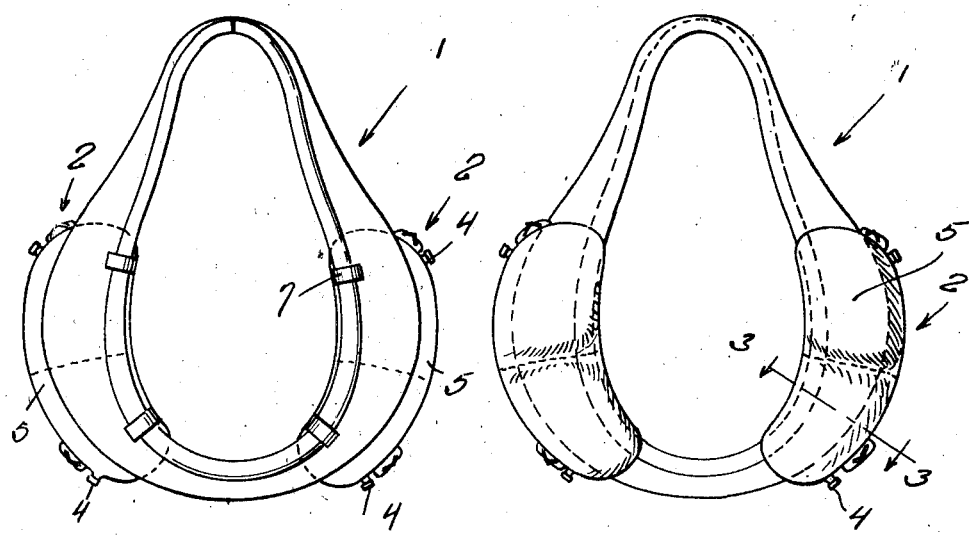
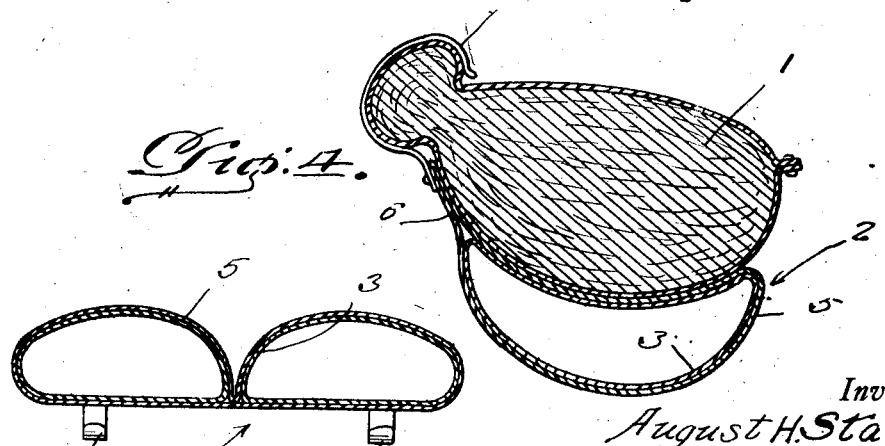
Inventor
August H. Stahl,
By Clarence A. O'Brien
Attorney Patented Apr. 5, 1927.

1,623,210

UNITED STATES PATENT OFFICE.

AUGUST H. STAHL, OF GRAFTON, NEBRASKA.

HORSE-COLLAR CUSHION.

Application filed September 22, 1926. Serial No. 136,989.

This invention relates to an improved cushion structure for use in association with horse collars, and it has more particular reference to a device which is constructed to conform to and bear against the shoulders of the animal to relieve it of undue chafing strain.

The invention has more particular reference to an improved product of manufacture which is in the form of an attachment and which includes means whereby it may be readily applied to a conventional form of collar.

Other features and advantages of the invention will become apparent from the following description and drawing.

In the drawing:—

Fig. 1 is a front view of a horse collar equipped with the improved pneumatic cushions.

Fig. 2 is a view looking at the rear side of the same.

Fig. 3 is an enlarged cross-section on the line 3—3 of Figure 2.

Fig. 4 is a central longitudinal section through the invention itself.

In the drawing the reference character 1 designates generally the horse collar which is of conventional form while the reference character 2 designates the improved pneumatic cushions per se.

Each cushion is of the same construction and is made up of a pair of duplicate air bags 3 constructed of rubber, each one being provided with a suitable valve 4 by means of which it can be conveniently inflated. These air bags are fitted into individual pockets formed in a canvas casing 5. The casing is of appropriate construction and is preferably formed from a single piece of material stitched in a manner to provide the separate cells or pockets for the two air bags. Under ordinary conditions two bags will be sufficient. The casing as well as the bags are, of course, shaped to conform with that portion of the collar against which they bear as indicated in Fig. 3. The inner side or that portion which bears against the shoulders of the horse is somewhat round in shape to render a comfortable fit. In making the canvas covering, the material is formed on one side to provide a double ply flange or tab 6 and attached to this are resilient attaching hooks 7 adapted to be snapped over the bead on the outer side of the horse collar as shown.

From the foregoing description and drawing it will be seen that I have evolved and produced an exceptionally simple and inexpensive contrivance in the form of an attachment which can be easily snapped onto a conventional form of horse collar. The advantage of the invention is that it will provide a comfortable contact of the collar with the shoulders of the animal and will prevent undue chafing. From the standpoint of construction, however, the invention is advantageous in that it is exceptionally easy to make, is highly compact and convenient, very light in weight and otherwise practical from the viewpoint of a manufacturer. In addition all of the rubber bags are identical in shape and size and are reversible and interchangeable, thus making it unnecessary to make special upper and lower bags. These and other advantages and features of the invention have doubtless been made apparent by the description and drawing. Consequently, a more lengthy description is thought unnecessary.

While the preferred embodiment of the invention has been shown and described it is to be understood that minor changes coming within the field of invention claimed may be resorted to if desired.

I claim:—

As a new product of manufacture, an air cushion for a horse collar comprising a casing constructed to provide upper and lower bag receiving pockets, individual inflatable air bags in said pockets, each bag being provided with an inflation valve, said casing being provided along one edge with an extending flap, and resilient hooks carried by said flap and adapted to detachably mount the device upon said collar.

In testimony whereof I affix my signature.

AUGUST H. STAHL.